United States Patent Office 3,745,052
Patented July 10, 1973

3,745,052
BUILDING PANEL WITH HIGH RELIEF AGGREGATE FACE
Lawrence D. Higgins, R.D. 1, P.O. Box 17,
Kintnersville, Pa. 18930
Filed Nov. 24, 1971, Ser. No. 201,804
Int. Cl. B32b 1/04, 5/16
U.S. Cl. 161—44                10 Claims

ABSTRACT OF THE DISCLOSURE

A building panel, having a frame designed to hold a backing of polyurethane foam or like material, with a resin laminate layer laid on the foam, and a gel layer laid on the laminate layer, with aggregate embedded in the gel to a depth of about one-third to one-fourth, to achieve a high relief aggregate face.

BACKGROUND OF THE INVENTION

(A) Field of the invention

This invention lies in the field of building panels and, more particularly, high relief aggregate faced building panels.

(B) Description of the prior art

There is presently a great demand in the building industry for panels, or panel sections, which provide a combination of strength, insulation, and pleasing appearance. Thus, for both outdoor and indoor use, it has become popular to use panels which may be directly attached or fixed in position on an inner wall, to form the final outer surface. One such type of panel in popular use is the aggregate panel, containing aggregate embedded in concrete. The aggregate, so embedded, gives a very desired appearance for building purposes. However, the aggregate-concrete panel has the dual limitations of unnecessary weight due to the concrete, as well as the fact that, in order to firmly hold the aggregate, it must be substantially embedded in the concrete. In typical construction, the aggregate is embedded into the concrete such that about two-thirds to three-fourths, or more, of the aggregate components are below the surface of the concrete, and accordingly not visible. The result is that, while the individual components are observable, the aggregate is in extremely low relief, and the appearance is often more like that of highly lumpy concrete than a true aggregate appearance. Thus, there is a need in the art for a form of construction whereby the aggregate in the panel is more highly exposed, giving rise to a high relief aggregate panel, which panel is at the same time light in construction, and which has desirable insulating qualities.

SUMMARY OF THE INVENTION

It is an object of this invention to provide a building panel having a high relief aggregate characteristic.

It is another object of this invention to provide a building panel having a face with distributed aggregate, which aggregate is minimally embedded in supporting material so as to expose a maximum amount of said aggregate, and containing an insulating backing.

In accordance with the above objectives, there is provided a framed building panel with an insulating foam backing, suitable for indoor or outdoor use, and having a face substantially comprised of aggregate shallowly embedded in a gel layer. The panel is contained within a housing which defines its exterior shape, and contains wooden glue strips which divide the foam backing into sections, which strips have the combined characteristics of providing edges available for gluing at the time the panels are secured in place, and of providing bracing against contraction of the polyurethane foam as it sets after being sprayed into position in the panel.

DESCRIPTION OF THE PREFERRED EMBODIMENT

Referring now to the figures, the panel is enclosed within a frame 22 which is of dimensions suitable for the application. A nominal sized frame, frequently used in construction, is that of 4' x 8', the frame members being suitably ¾" in thickness, and 2" wide (in a direction normal to the panel surfaces). The frame thus defines the shape of the panel, and also defines a back panel surface 32 and a front panel surface 33, which surfaces are parallel and displaced by width of the frame members, e.g., 2".

In one embodiment, the frame is constructed of wood, suitably white cedar, the pieces of wood being joined in any suitable manner. The frame may also suitably be metal, aluminum being particularly adapted for this use because of its strength and relative lightness. The frame is suitably rectangular in form, but may take any other desired geometrical shape, e.g., a hexagonal, as desired by the architect.

Figure 3:
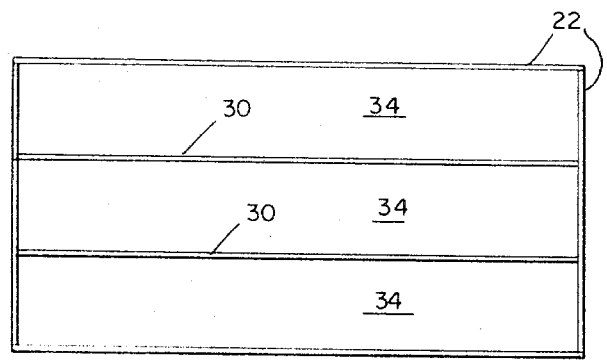
FIG. 3 is a schematic representation of the bottom side of the panel of this invention.

On the underside of the frame, as illustrated in FIG. 3, there are positioned a plurality of glue line strips, suitably of white cedar. For 4' x 8' panels, the glue line strips are fastened at 16" centers to the 4' sides of the panel. The glue line strips are positioned flush with the back surface 32 of the frame, and are of a height less than the thickness of the frame, i.e., less than the distance between the back surface 32 and the front surface 33. The glue line strips are constructed of wood, preferably white cedar, and define separate panel portions 34.

Figure 1:
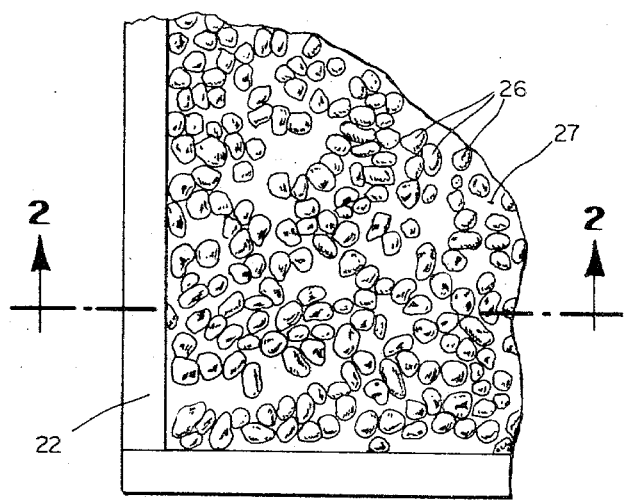
FIG. 1 is a plan view of a corner portion of a panel of this invention, illustrating the appearance of the aggregate face.
Figure 2:
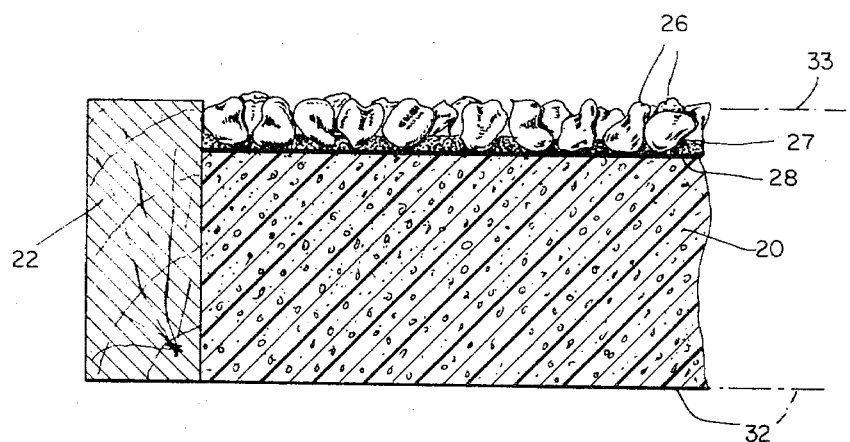
FIG. 2 is a sectional view taken along line 2—2 of FIG. 1.

Referring specifically to FIG. 2, the rearward portion of the panel, within frame 22, is preferably comprised of a layer 20 of polyurethane foam. The foam layer 20 has its back surface coincident with back frame surface 32, and has a forward surface somewhat back of the front surface of frame 22, leaving a space, or cavity within the frame and at the front thereof. The thickness of the foam layer is the same as the width of the glue line strips 30, such that strips 30 lie wholly within but do not extend beyond foam layer 20.

The foam, preferably of 2 lb. density, is shot into the panel from a gun in a conventional manner. The polyurethane foam has characteristics of strength, and particularly of insulation. It is to be noted that other plastics having similar properties may be used instead of polyurethane, e.g., polystyrene, to foam layer 20, and they may be placed within the panel by any suitable method. The foam layer 20, when placed within the frame, is sectioned off by the glue line strips 30, which strips absorb the forces of contraction when the foam cures, or hardens, substantially preventing distortion of the outside members of frame 22, such that the frame maintains its substantially rectangular shape.

Immediately forward of foam layer 20 is placed a laminating resin strip 28, suitably a glass laminating cloth impregnated with either epoxy or polyester. The cloth may be a nominal 6 ounce type of glass cloth and, when impregnated with the epoxy or polyester, provides a strong base layer. Immediately forward of layer 28 there is placed a gel coat, also suitably epoxy or polyester. The gel coat 27 is of a sufficient thickness to be able to capture and hold the aggregate 26 which is embedded therein before the gel coat 27 hardens. The aggregate may be comprised of any desired size components, and no more than about one-fourth to one-third of the aggregate surface is embedded in the gel coat. The gel coat 27 may be colored, as with a suitable dye, to compliment the color of the aggregate.

In construction of the panel of this invention, the frame 22 is first constructed in its desired size and shape. It is then placed, front surface down, into a form, suitably a steel form, having confining dimensions equal to the outside dimensions of the frame, e.g., 4' x 8'. The steel form also has a planar surface portion, displaced backward of the forward surface of the panel frame, providing a polished surface displaced to the level of the desired forwardmost surface of the foam layer 20. With the frame 22 thus in position within the steel form, the white cedar glue line strips are laid in the form and fastened to opposite sides. Corresponding to a 2" thick frame, the glue line strips are suitably 3/4" thick, and 1½" high, such that they rest on the steel frame surface and are flush with the back frame surface 32. For the 4' x 8' panel, two such strips are used, forming three panel portions 34. The polyurethane foam is sprayed or shot into the portions 34. After the foam hardens, or sets, the excess foam on the back is scraped or scarfed down to the back surface, just exposing the wooden surfaces of the blue line strips. At this point, the glue line strips are precisely embedded within the foam layer, being of the same thickness of the layer. After this, the steel frame is removed, leaving the foam layer solidly in place within the frame walls. A forward space, or cavity, is left within the frame walls forward of the foam layer.

Across the surface of the forward cavity there is applied a layer 28 of approximately 40 mils of either epoxy or polyester. It is, of course, possible to apply first a layer of epoxy and then a layer of polyester, or vice versa, but if this is done, the first layer must be allowed to set or cure before the other one is applied, as they do not mix. After application of the layer 28 of epoxy or polyester laminating resin, a glass laminating cloth, sized to cover the entire cavity surface, is laid on and rolled into the laminating resin. The glass cloth, nominally of 6 ounce type, is thus impregnated, and when hardened forms a strong barrier, designated by the numeral 28. Alternately, glass may be mixed with the epoxy (or polyester) and sprayed onto the forward surface of the layer 20.

After the curing or setting of the first laminated layer 28, a second coating 27, designated a gel coating and comprising epoxy or polyester, is applied by a troughing or spraying onto the first laminate layer. This layer is of a thickness equal to approximately one-fourth to one-third of the size of the aggregate to be employed. After the layer 27 of epoxy or polyester is laid, and before it gels, the aggregate is applied thereto and tamped in, so that the backward portions of the aggregate firmly penetrate through layer 27 to layer 28. Upon hardening of the gel layer 27, the individual components of aggregate 26 become set therein, with approximately two-third to three quarters of their surface extending forward of the gel layer 27, thus giving the desired high relief.

It is to be understood that the dimensions of the panel of this invention may be adjusted as desired. Thus, a range of aggregate sizes may be used, with corresponding thickness of the panel. It is also to be noted that the aggregate may extend forward to approximately the front surface, such that the forward tips of the aggregate components are approximately level with the forward edges of the panel sides. On the other hand, the aggregate may extend substantially forward of such front surface.

In a typical panel of this invention, the panel frame has exterior dimensions of 4' x 8', and is composed of white cedar wood. The frame is 2" in width, i.e., from front to back, and there are two glue line strips, each 3/4" wide and 1½" high, extending from the back surface of the frame to a point ½" forward from the front surface of the frame. The insulating foam layer, divided into three sections by the two glue line strips, is 1½" in thickness. First laminating layer 28 is approximately 40 mils in thickness, and comprises 6 ounce type glass cloth impregnated with epoxy and/or polyester. Gel layer 27 is approximately 1/8" in thickness, and is comprised of epoxy and/or polyester. The aggregate is 3/8" aggregate, having approximately one-third thereof embedded in the gel layer.

From the above it is seen that there is provided a panel which is easy to foam, and has the desired characteristics of light weight, strength, insulation, and a high relief aggregate surface. The panels may be attached into place by any conventional means and, in addition, glue may be applied to the exposed surfaces of the glue line strips to aid in holding the panels to the interior surface.

I claim:
1. A building panel comprising:
   (a) a closed frame defining a back surface and a front surface and having a thickness between said surfaces;
   (b) a layer of foam within said frame, flush with said back surface and extending forward toward said front surface a second thickness less than the thickness of said frame;
   (c) wooden glue line strips integrally fixed between opposite sides of said frame, said strips being flush with said back surface and extending forward a distance equal to said second thickness to the forward edge of said foam layer;
   (d) a laminating resin layer fixed to the forward edge of said foam layer and to said strips;
   (e) a gel layer, affixed to said laminating resin layer, and extending forward therefrom, the forward extension of said gel layer being back of said front surface; and
   (f) aggregate embedded in said gel layer.
2. The panel as disclosed in claim 1, wherein said frame is constructed of wood, and is rectangular.
3. The panel as described in claim 1, wherein said frame is constructed of aluminum, and is rectangular.
4. The panel as described in claim 1 wherein said laminating resin layer comprises epoxy with a glass cloth rolled into same.
5. The panel as described in claim 1 wherein said laminating resin layer comprises polyester with a glass cloth rolled into same.
6. The panel as described in claim 1 wherein said gel layer comprises epoxy.
7. The panel as described in claim 1 wherein said gel layer comprises polyester.
8. The panel as described in claim 1 wherein about one-fourth of the surface of said aggregate is embedded in said gel layer.
9. The panel as described in claim 1 wherein about one-third of the surface of said aggregate is embedded in said gel layer.
10. The panel as described in claim 1 where said foam layer is comprised of polyurethane.

References Cited

UNITED STATES PATENTS

| | | | |
|---|---|---|---|
| 3,502,539 | 3/1970 | MacPhail | 161—160 |
| 3,507,738 | 4/1970 | Prusinski et al. | 161—162 |
| 971,369 | 9/1910 | Genest et al. | 161—44 |
| 3,649,424 | 3/1972 | Rhiando | 161—162 |
| 3,523,849 | 8/1970 | Dunsby | 161—162 |
| 3,344,011 | 9/1967 | Goozner | 161—44 |

DOUGLAS J. DRUMMOND, Primary Examiner

U.S. Cl. X.R.

161—160, 162